Feb. 19, 1924.
M. O. SNEDIKER
GRADUATED MOVEMENT REGULATOR
Filed Jan. 7, 1922
1,484,092
2 Sheets-Sheet 1
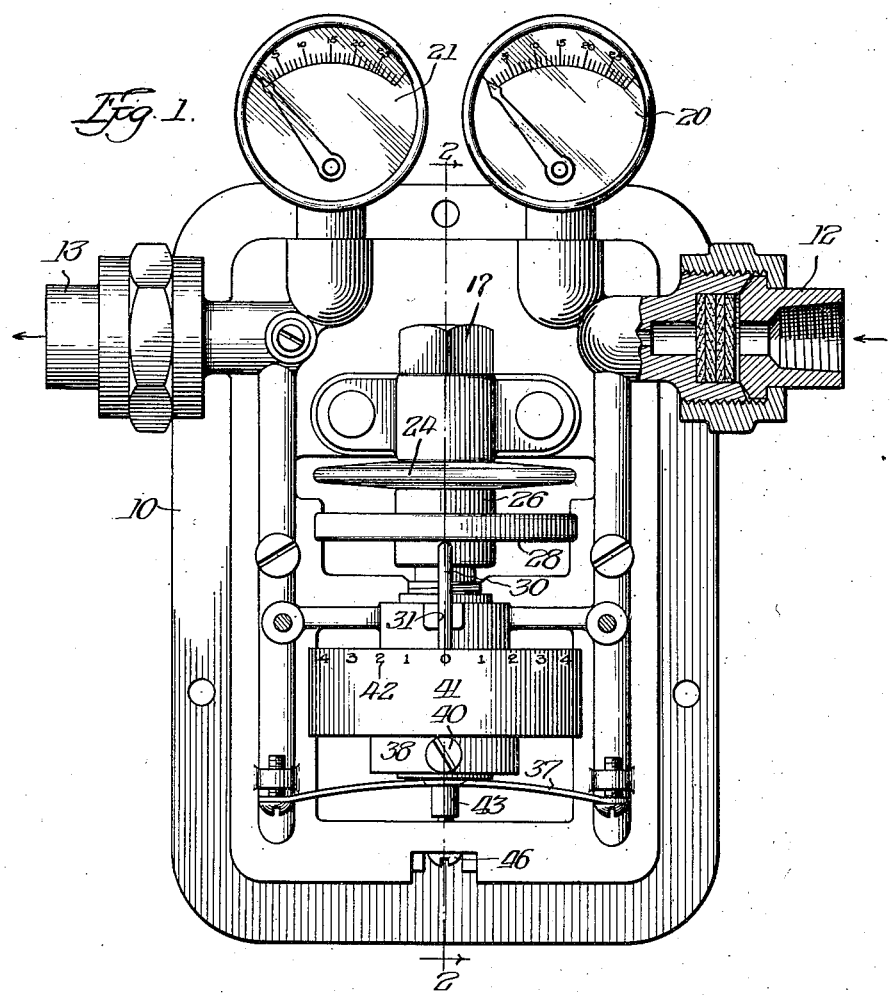

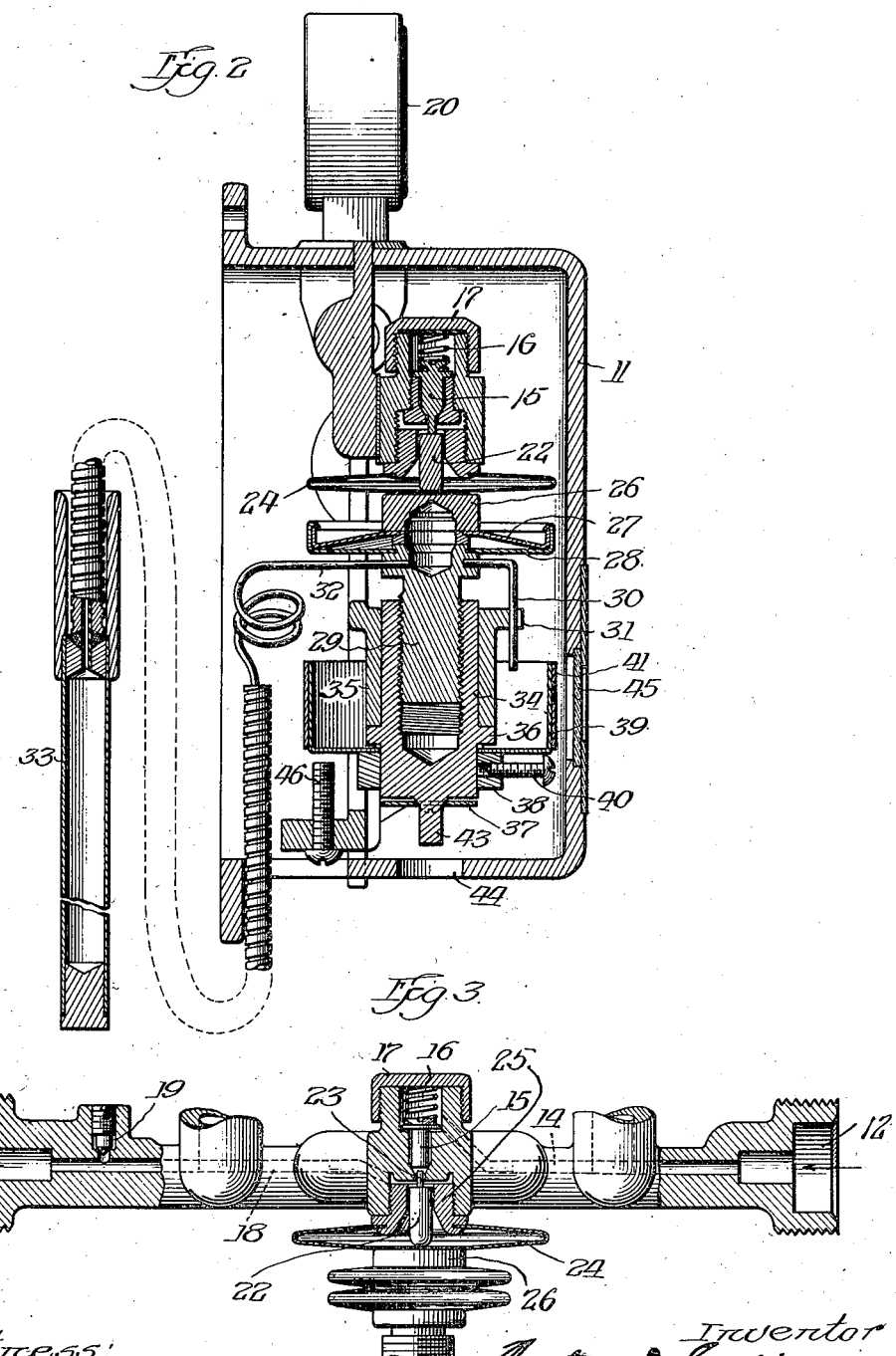

Patented Feb. 19, 1924.

1,484,092

UNITED STATES PATENT OFFICE.

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS.

GRADUATED-MOVEMENT REGULATOR.

Application filed January 7, 1922. Serial No. 527,617.

*To all whom it may concern:*

Be it known that I, MORTON O. SNEDIKER, a citizen of the United States, and resident of Chicago, in the county of Cook and State of Illinois, have invented certain new and useful Improvements in a Graduated-Movement Regulator, of which the following is a specification.

My invention relates to regulators and particularly to a novel mechanical apparatus adapted to effect the graduated control of dampers or valves through the medium of an auxiliary force such as compressed air.

One of the objects of my invention is to provide improved apparatus so designed as to effect the desired control in a more satisfactory manner. To that end I provide in the regulating apparatus an air control diaphragm or bellows, the expansion of which is opposed to the expansion of the thermostatic element, the resultant or differential of the two forces acting upon a valve which controls the supply of compressed air effective to regulate the position of the valve for the heat supplying medium. In addition I provide a constantly-open relief or escape valve located in the passage between the compressed air valve and the heat control valve.

By means of the mechanism here disclosed, I am able to maintain a desired temperature within narrower limits of variation than has heretofore been possible and in addition the mechanism is more sturdy and contains no delicate parts nor minute and sensitive valves.

One of the important steps in advance, leading toward more accurate control, is that of the provision of the air bellows the interior of which is in communication with the air on the outlet side of the control valve. In devices of similar construction heretofore proposed the bellows has been in communication with the air on the inlet side; in other words, in constant communication with the maximum pressure of the air.

The invention will be more readily understood by reference to the accompanying drawings, wherein, Fig. 1 is a face view with the cover removed, of a regulating apparatus constructed in accordance with my invention;

Fig. 2 is a sectional view on the line 2—2 of Fig. 1, and,

Fig. 3 is a sectional view, somewhat diagrammatic in character, by means of which the passage of the regulating fluid such as compressed air, may readily be traced.

Referring to the drawings it will be seen that I have provided a frame or casing 10, to which a cover 11 is adapted to be secured. The casing provides for an inlet connection 12, and an outlet connection 13, for compressed air, which is preferably maintained at a substantially constant pressure of fifteen pounds per square inch. The supply of compressed air is conducted through a passage 14, to a valve 15, normally held against its seat by a spring 16, the space within which the spring is seated being covered by a screw-cap 17. A second passage 18 conducts towards the outlet the compressed air which escapes past the valve 15. Located at a suitable point in the passage 18, is a constantly open escape valve 19, which is adjusted in order to provide a waste opening of the required size. Located in the two passages 14, 18, are branch passages to the outlets to which gauges 20, 21, respectively are connected. These serve to indicate the inlet and outlet pressures of the fluid.

Located beneath the valve 15, is a plunger 22, the upper end of which contacts a concentric projection 23 from the valve 15, the plunger being loosely mounted in the opening in which it is positioned. The plunger is seated within the two walls of a bellows 24, and therefore the interior of the bellows is in communication with the fluid on the outlet side of the air valve 15. One wall of the bellows is firmly secured to a threaded plug 25, which is seated within the portion of the casing which carries the valve 15. The other wall of the bellows is adapted to bear against a block 26, which is secured to the relatively movable wall 27 of a second bellows. The opposite wall 28 of the second bellows is anchored in a threaded block 29 which is held against rotation by means of a projection 30, engaging with a lug 31, forming a part of the frame. The space between the walls 27, 28, of the second bellows is in communication by means of a flexible tube 32, with a rigid tube 33, adapted to contain a substance which vaporizes or volatilizes at a temperature corresponding substantially to that at which regulation is to be effected. The pressure generated by the vapor emanating from the thermostatic fluid acts on the second bellows, tending to expand the same in a well known manner.

The plug 29 is held in threaded engagement with a sleeve 34, fitted within a circular opening in a part 35 of the frame, a flange 36 on the sleeve serving to limit the upward movement thereof. A stiff flat spring 37, which engages the lower extremity of the sleeve maintains the same in its proper position, and provides against damage to the bellows as the result of the development of pressure above that contemplated for normal operation. A ring 38, carrying a flanged disk 39, is fixedly secured to the lower portion of the sleeve 34 by means of a set-screw 40. On the vertical face 41, of the flange of the disk I provide suitable graduations 42. A square projection 43, from the lower end of the sleeve extends through a central opening in the flat spring 37 and is presented opposite a relatively larger opening 44, in the cover 11. A suitable tool extending through the opening 44 and engaging the square projection may be employed for rotating the sleeve including the graduated disk, the face of which is visible through the glass covered sight opening 45, in order to adjust the device as required. A vertically positioned screw 46 is so located as to act as a limit stop preventing complete rotation of the adjusting element.

In Fig. 3, which is as stated, somewhat diagrammatic in character, the section plane is rotated in order to illustrate the vent 19. In that view an alternate form of the second bellows 27, 28. is shown, two capsules being employed instead of one, as shown in Figs. 1 and 2.

The operation is as follows:

Assuming that the outlet 13 is connected by suitable piping to a heat control valve and that the valve is so arranged that it is normally maintained in open position by spring pressure, it will be seen that air pressure must be provided in order to close the valve and exclude the heating medium. Assuming also that the inlet is connected to a suitable supply of air under pressure and that the parts have previously been adjusted as required, with the thermostatic element 33 so located as to communicate the temperature conditions in the usual manner, it will be seen that an increase in the temperature will, through the medium of the thermostatic element tend to expand the bellows, comprised by the walls 27, 28, and to open the valve 15. This will serve to admit a greater volume of air under pressure and this air so admitted will immediately act through the medium of the first bellows 24, to oppose the opening movement of the valve. The increased pressure within the outlet passage 18 will be communicated to the heat controlled valve, tending to close the same. The constant waste of air past the valve 19 will serve to lessen the pressure within the space past the inlet valve 15, and the thermostatic and equalizing bellows will come to a balance with the inlet valve open to an extent proportional to the opening of the waste valve 19, and this will continue so long as the temperature within the space to be controlled remains constant. A reduction of the temperature within the space to be controlled will serve to permit the contraction of the thermostatic bellows and permit the closing of the inlet valve. Thereafter the waste of air through the opening 19 will relieve the pressure at the heat control valve and permit the opening of the valve and the supply of additional heat.

The additional of the air pressure bellows in opposition to the thermostat and the provision of the constant waste opening results in the production of a device in which the regulating action is not only graduated but is extremely uniform in its action and will maintain the temperature more nearly constant than the devices heretofore proposed.

The detail including the thermostatic bulb connected to the operating bellows by means of a flexible tube, while old in other forms of thermostatic control devices, is new in a combination such as here disclosed. It adapts the device to a number of uses not heretofore possible and contributes to the general result: that of simplicty and rugged construction.

Obviously the construction is capable of much modification and I do not wish to be limited except as indicated in the appended claims.

I claim:

1. In a regulating device, the combination of a casing providing a conduit for air under pressure, an air control valve dividing said conduit into inlet and outlet passages, a bellows one wall of which is anchored to the casing, a plunger within said bellows and bearing at one end upon the movable wall of said bellows, the other end of said plunger being adapted to contact said valve, a second bellows adapted to be connected to a thermostatic element and so located that its movable wall may contact the movable wall of said first bellows, and means for bodily moving the relatively fixed wall of said thermostatic bellows whereby to regulate the operation of the device.

2. In a regulating device, the combination of a member providing a conduit for a motive fluid, a valve interposed in said conduit, a bellows the interior of which is in communication with the motive fluid after it passes said valve, the expansion of said bellows tending to permit the seating of said valve, said conduit being provided with a constantly open vent, a second bellows located adjacent to said first bellows and adapted on expansion to unseat said valve against the pressure exerted by said first mentioned bellows, a distant thermostatic element, a flexible tube connecting the interior of the same with the interior of said bellows, and means for bodily moving one wall of said thermostatic bellows for the purpose of adjusting the action thereof.

3. In a regulating device, the combination of a member providing a conduit for a motive fluid, a valve interposed in said conduit, a bellows the interior of which is in communication with the motive fluid after it passes said valve, the expansion of said bellows tending to permit the seating of said valve, said conduit being provided with a constantly open vent, a second bellows located adjacent to said first bellows and adapted on expansion to unseat said valve against the pressure exerted by said first mentioned bellows, a distant thermostatic element, a flexible tube connecting the interior of the same with the interior of said bellows, means for bodily moving one wall of said thermostatic bellows to adjust the action of the same, and a normally rigid spring for maintaining the thermostatic bellows in operative position and permitting abnormal expansion thereof.

4. In a graduated movement regulator, the combination of means providing a passage for a motive fluid, a diaphragm adapted to be acted upon by the fluid, a spring-seated valve in said passage, the expansion of said diaphragm under the action of said fluid tending to permit the seating of said valve, an open vent in said passage past said valve, a thermostatic bellows having relatively fixed and movable walls, said movable wall acting in opposition to said diaphragm and connected to said valve whereby to open the valve on expansion of said bellows, a distant rigid thermostatic tube adapted to contain a volatile liquid, a flexible tube connecting the interior of said thermostatic tube to said thermostatic bellows, and means for moving said relatively fixed wall of said thermostatic bellows whereby to change the adjustment thereof.

Signed at Chicago, Ill., this 30th day of December, 1921.

MORTON O. SNEDIKER.